June 24, 1969 S. K. MITRA 3,452,304

NONRECIPROCAL WAVE TRANSLATING DEVICE

Filed May 10, 1967

INVENTOR
S. K. MITRA
BY Leonard A. Arnold
ATTORNEY

United States Patent Office 3,452,304

Patented June 24, 1969

3,452,304

NONRECIPROCAL WAVE TRANSLATING DEVICE

Sanjit K. Mitra, Davis, Calif., assignor to Bell Telephone Laboratories, Incorporated, Murray Hill, N.J., a corporation of New York Filed May 10, 1967, Ser. No. 637,507
Int. Cl. H01p 1/24; H03h 5/00
U.S. Cl. 333—80 2 Claims

ABSTRACT OF THE DISCLOSURE

Gyrator circuits utilizing three transistors with the collector of a first connected to both the base of a second transistor and the base of the third transistor. The base electrode of the first transistor is connected to the collector of the third and the input to the circuit is taken between the emitters of the first and third transistors, with the output taken between the emitters of the second and third transistors.

*Background of the invention*

This invention relates to nonreciprocal translating networks and more particularly to gyrators.

A gyrator is defined as a four terminal, two port network which is described by the following pair of equations:

$$I_1 = -V_2 G \quad (1)$$

$$I_2 = V_1 G \quad (2)$$

where $I_1$ is the current into and $V_1$ is the voltage across the two terminals constituting one port and $I_2$ is the current into and $V_2$ the voltage across the two terminals constituting the second port. G is the transfer conductance.

Since the coefficients of the voltage terms are of opposite sign, and, in general, are unequal, the gyrator violates the reciprocity the theorem. In simple terms, the reciprocity theorem states that if a current source is inserted at one point in a network and if the voltage produced thereby at some other part of the network is measured, the ratio of the measured current to the applied voltage called the transfer admittance will be the same if the relative positions of the driving source and the measured effect are reversed. While the usual electrical circuit elements such as resistors, capacitors, inductors and transformers satisfy the reciprocity theorem, in the gyrator the transfer admittance for one direction of propagation differs in sign from that for propagation in the reverse direction and their magnitudes may in general be unequal.

One very important application of the gyrator is as an impedance inverter, i.e., if an impedance Z is connected between one pair of terminals, the impedance measured at the other terminals is proportional to 1/Z. Thus a capacitor, with capacitance $C_1$, may be made to appear as an inductor whose inductance is proportional to $C_1$.

Network synthesis, in the past, has been based primarily upon the existence of four basic circuit elements, the capacitor, the resistor, the inductor, and the transformer. In recent years, the introduction of a fifth circuit element, the gyrator, has led to considerably improved solutions for many network problems. Gyrator circuits have been realized by a variety of means including mechanically coupled piezoelectric and electromagnetic transducers, by means of electromagnetic coupling to gyromagnetic materials at microwave frequencies, and most recently by the combination of active and passive circuit components which employ vacuum tubes or transistors as the active circuit elements. In this latter class of gyrator circuits, gyrator action is achieved through the use of special circuit configurations rather than as a result of the particular adjustment of one or more parameters of the circuit. As a result, such a gyrator is substantially independent of variations in the parameters of the active circuit elements and the accuracy of the gyrator action is relatively insensitive to changes in the circuit components, variations in environment, and aging of the particular elements.

With the advent of integrated circuits the configuration of a network has become increasingly important. While the transistorized circuits of the prior art have worked satisfactorily it is desirable to have a larger variety of circuits to choose from in order that the designer of integrated circuit apparatus may have greater latitude in designing and fabricating such apparatus.

It is accordingly, an object of the present invention to provide alternative circuit configurations for transistorized gyrators.

*Summary of the invention*

In accordance with the present invention a gyrator circuit comprises a plurality of transistors each having emitter, collector and base electrodes. The collector of a first transistor is connected to the base of a second transistor and to the base of a third transistor, while the base electrode of the first transistor is connected to the collector of the third transistor. With an input circuit connected between the emitter of the first transistor and the emitter of the second transistor, gyrator action is obtained between the input circuit and an output circuit connected between the emitters of the second and third transistors.

*Brief description of the drawings*

This invention will be more fully comprehended from the following detailed description taken in conjunction with the drawings in which.

*Description of illustrative embodiments*

Figure 1:
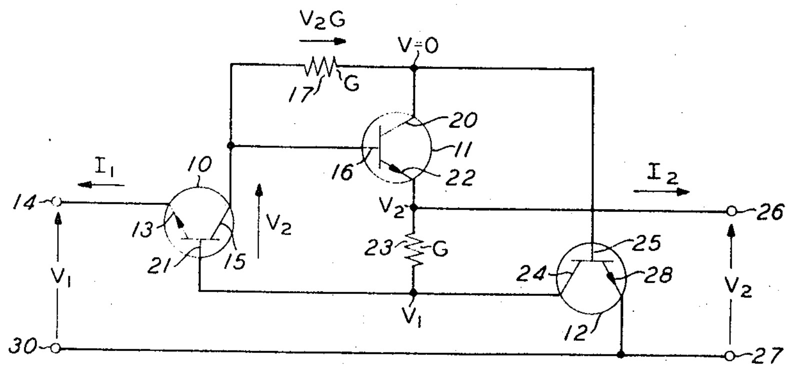
FIG. 1 is a schematic diagram of a first gyrator circuit embodying this invention.

A gyrator embodying this invention is shown in FIG. 1. Three junction transistors 10, 11 and 12, each having emitter, collector and base electrodes, are the only active elements employed. The emitter electrode 13 of transistor 10 is connected to one circuit input terminal 14, and the collector electrode 15 of transistor 10 is connected to the base electrode 16 of transistor 11. A resistor 17, having a conductance G, is connected between collector electrode 15 of transistor 10 and collector electrode 20 of transistor 11. The base electrode 21 of transistor 10 is connected to the emitter electrode 22 of transistor 11 by means of resistor 23, having a conductance G, and is also directly connected to the collector electrode 24 of transistor 12. The collector electrode 20 of transistor 11 is directly connected to the base electrode 25 of transistor 12, and the output terminals 26 and 27 are directly connected to emitter electrode 22 of transistor 11 and emitter electrode 28 of transistor 12. The emitter electrode 28 of transistor 12 is also directly connected to the second input terminal 30.

That the circuit shown in FIG. 1 satisfies Equations 1 and 2 may be shown by the following analysis: Assume ideal transistors are used, i.e., that the base current, $i_b$, is equal to zero, the voltage between the base and emitter electrodes, $V_{be}$, is equal to zero, and that the emitter and collector currents, $i_e$ and $i_c$ respectively, are equal. Let terminals 27 and 30 be the voltage reference node assumed to be zero. By definition, the voltage at the emitter 22 of transistor 11 is equal to $V_2$, and since $V_{be}=0$, then the voltage at the collector electrode 15 of transistor 10 is also at voltage $V_2$. Since $V_{be}=0$, the base electrode 25 of transistor 12 is equal to the reference node voltage, or zero volts and the current through resistor 17 is $V_2G$ where G is the conductance of resistor 17. Because $i_b=0$ and $i_e=i_c$, the input current, $I_1$, is equal to $-V_2G$, the current flowing in resistor 17. Thus $I_1=-V_2G$ and Equation 1 is satisfied.

Since $V_{be}=0$, then the voltage $V_1$ at emitter electrode 13 of transistor 10 is also present at its base electrode 21 and at the lower terminal of resistor 23. Since the upper terminal of resistor 23 is at voltage $V_2$ and the conductance of resistor 23 is G then $I_2$, the current flowing from emitter 22 of transistor 11 toward terminal 26 plus $$(V_2-V_1)G$$

the current flowing in resistor 23, equals the emitter current $i_e$ in transistor 11. Since $i_e=i_c$ and since the collector current in transistor 11 is equal to $V_2G$, the current flowing in resistor 17 is $$I_2+(V_2-V_1)G=V_2G$$

and $$I_2=V_1G$$

Equation 2 is satisfied. Thus the circuit shown in FIG. 1 functions as a gyrator.

A second gyrator circuit embodying this invention comprises three transistors 50, 51 and 52. One input terminal 53 of this gyrator circuit is connected to the emitter electrode 54 of transistor 50 and the second input terminal 56 is connected to the base and collector electrodes 57 and 58 of transistor 50; the emitter electrode 60 of transistor 51 and the base electrode 61 of transistor 51 by resistors 62, 63, 64 and 65 respectively. Resistors 62, 63, 64 and 65 have conductances $G_a$, G, $G_a$ and G respectively. The collector electrode 58 of transistor 50 is directly connected to the base electrode 68 of transistor 52, and a direct connection is also made between the base electrode 57 of transistor 50 and the collector electrode 70 of transistor 51. Finally, a direct connection is made between collector electrode 71 of transistor 52 and base electrode 61 of transistor 51. One output terminal 72 is directly connected to input terminal 56 and the second output terminal 73 is connected to emitter electrode 74 of transistor 52.

Figure 2:
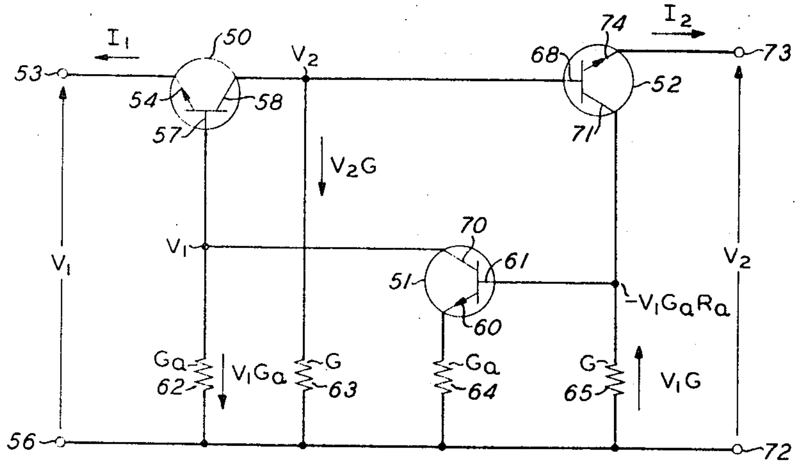
FIG. 2 is a schematic diagram of a second gyrator circuit embodying this invention.

That the circuit shown in FIG. 2 satisfies Equations 1 and 2 is demonstrated by the following analysis: Assume ideal transistors so that for each transistor $i_b=0$, $V_{be}=0$ and $i_e=i_c$. Let terminals 56 and 72 be the voltage reference node and assume that they are at zero potential. Since $V_{be}=0$ the voltage $V_2$ present at terminal 73 is also present at the base electrode 68 of transistor 52. The current flowing through resistor 63, having a conductance G, is then $V_2G$ and since $i_b=0$ the value of the collector current for transistor 50 is $V_2G$. Since $i_e=i_c$ then the current $I_1$ flowing from emitter electrode 54 of transistor 50 to terminal 53 is $$I_1=-V_2G$$

and Equation 1 is satisfied.

Since the voltage at terminal 53 is $V_1$ and $V_{be}=0$ then the voltage at the base electrode 57 of transistor 50 is also $V_1$ and the current through resistor 62 having a conductance $G_a$ is $V_1G_a$. Since $i_b=0$ all of this current flows to collector 70 of transistor 51 and since $i_e=i_c$ the current through resistor 64, having a resistance $R_a$, is $V_1G_a$ and the voltage at the emitter electrode 60 and base electrode 61 of transistor 51 is $-V_1G_aR_a$, which, of course, is equal to $-V_1$. As a result, the current flowing through resistor 65 having a conductance G is $V_1G$ and since $i_e=i_c$ then $I_2=V_1G$. Thus if resistors 63 and 65 have the same value and resistors 62 and 64 have the same value, Equation 2 is satisfied.

Thus in accordance with this invention, new gyrator circuits not heretofore known are made available to the integrated circuit designer providing him with greater latitude in the design of integrated circuits than heretofore available.

It is to be understood that the above-described arrangements are merely illustrative of the application of the principles of the invention. Numerous other arrangements may be devised by those skilled in the art without departing from the spirit and scope of the invention.

What is claimed is:

1. A gyrator comprising, in combination, three transistors each having an emitter electrode, a collector electrode and a base electrode, means for connecting the collector electrode of a first transistor to the base electrode of a second transistor, a resistor connecting the collector electrode of said first transistor to the collector electrode of said second transistor, a direct connection between the collector electrode of said second transistor and the base electrode of said third transistor, a resistor connected between said emitter electrode of said second transistor and the base electrode of said first transistor, a direct connection between the base electrode of said first transistor and the collector electrode of said third transistor, means for connecting an input circuit between said emitter electrode of said first transistor and the emitter electrode of said third transistor, and means for connecting an output circuit between the emitter electrode of said third transistor and the emitter electrode of said second transistor.

2. A gyrator circuit comprising, in combination three transistors each having an emitter electrode, a collector electrode, and a base electrode, a direct connection between the collector electrode of a first of said transistors to the base electrode of a second transistor, a first resistor connecting said base electrode of said first transistor to a first terminal, a second resistor connecting said collector electrode of said first transistor to said first terminal, a direct connection between the base electrode of said first transistor and the collector electrode of said third transistor, a third resistor connecting said emitter electrode of said third transistor to said first terminal, a fourth resistor connecting the base electrode of said third transistor to said first terminal, a direct connection between the collector electrode of said second transistor and the base electrode of said third transistor, a second terminal connected to said emitter electrode of said first transistor, a third terminal connected to the emitter electrode of said second transistor so that the relationship between the voltage $V_1$ across said first two terminals and the current $I_1$ flowing through said terminals to the voltage $V_2$ across said first and third terminals and the current $I_2$ flowing through said terminals is defined by the following pair of equations:

$$I_1=-V_2G$$

$$I_2=V_1G$$

where G is the conductance of said first and fourth resistors.

References Cited

Leightner, Core Memory Sense Amplifier, IBM Tech. Disclosure Bulletin, vol. 4, No. 4, September 1961.

HERMAN K. SAALBACH, *Primary Examiner.*

P. L. GENSLER, *Assistant Examiner.*

U.S. Cl. X.R.

307—262; 333—24